May 1, 1928.  
B. E. BYRD  
1,667,880  
TRACTOR PLOW AND CULTIVATOR  
Filed Aug. 2, 1921  
2 Sheets-Sheet 1
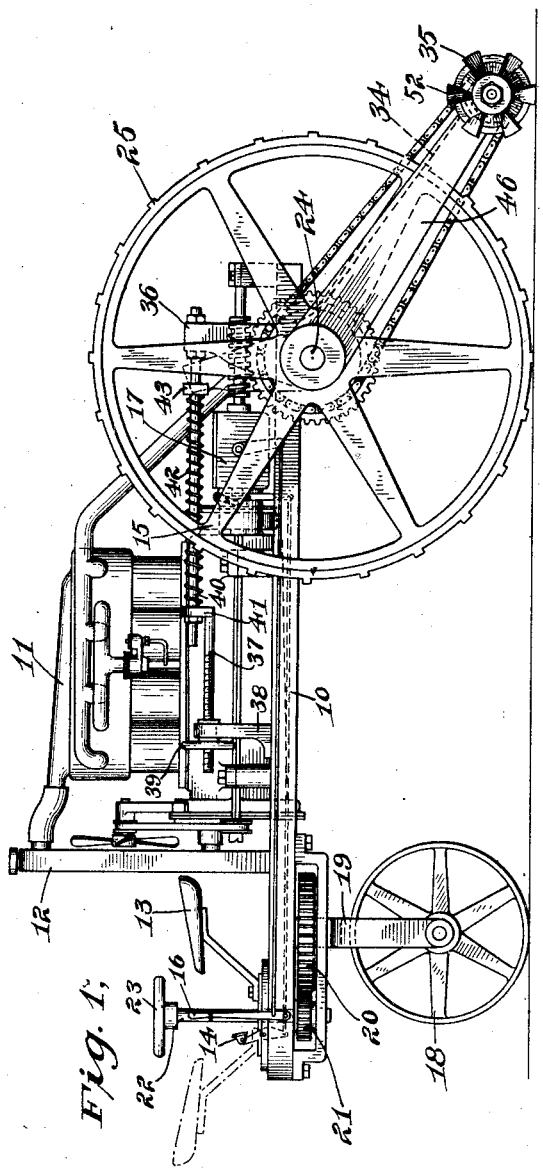
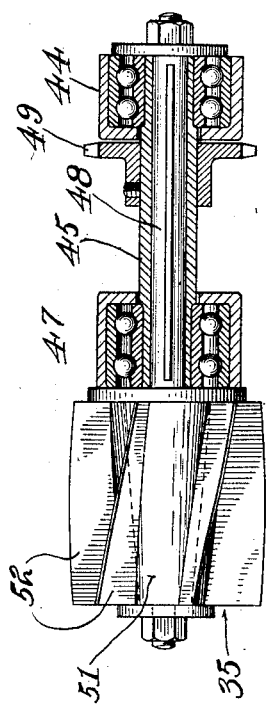
Inventor  
Britton E. Byrd  
By his Attorneys  
Meyers, Cavanagh, Whitehead & Hyde

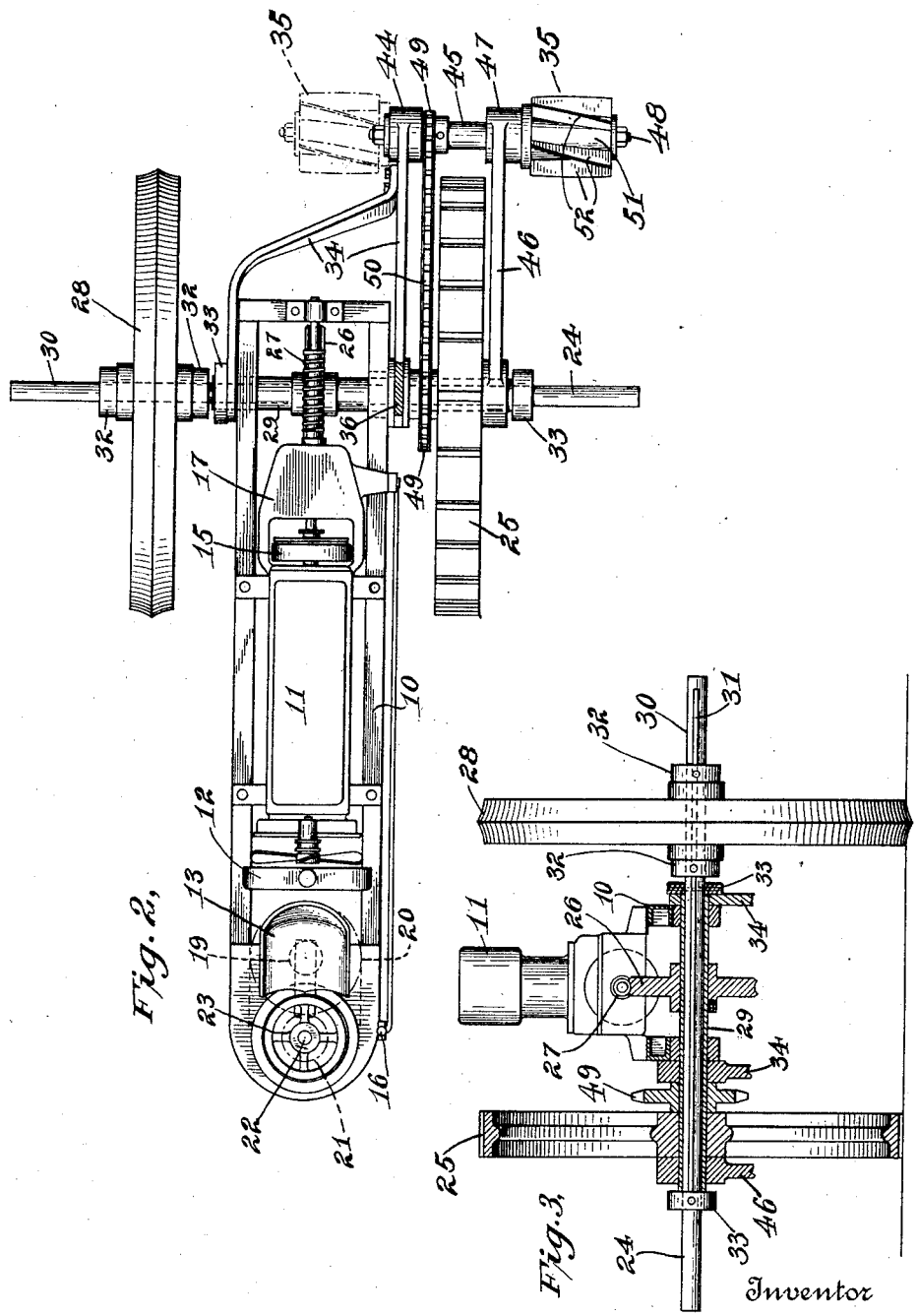

Patented May 1, 1928.

1,667,880

UNITED STATES PATENT OFFICE.

BRITTON E. BYRD, OF DURHAM, NORTH CAROLINA, ASSIGNOR TO MILL DEVICES COMPANY, INC., OF GASTONIA, NORTH CAROLINA, A CORPORATION OF NORTH CAROLINA.

TRACTOR PLOW AND CULTIVATOR.

Application filed August 2, 1921. Serial No. 489,276.

My invention relates to agricultural tractors, and particularly to a light tractor adapted to have agricultural implements mounted thereon and preferably to be operated by one man.

One of the objects of the invention is the provision of a tractor especially adapted for general purpose duty on a farm, wherein the tractor is relatively light in weight, yet with sufficient power for heavy duty, capable of being handled by a single operator, and adapted to carry implements as a part of its construction, as well as to draw other implements.

Another object is to provide a tractor wherein the implements may be readily changed, and varied in kind, and wherein mechanism is provided for adjusting the implement to vary the degree of pressure and the depth of the cut, as well as to retract the implement and support it above the ground when desired.

Another object is to provide a tractor of a character such that it may be used between adjacent rows of growing plants, and may be adjusted in accordance with the space between the rows, and wherein it may be moved in either direction without substantial alteration, and wherein mechanism is provided for supporting the implement on either side of the tractor.

Another object is to provide a tractor having a cutting implement constructed to be rotated by its engagement with the soil at a speed slightly greater than that of the tractor thereby to add to the tractor effort of the motor, while performing the excavating function efficiently.

Another object is to provide a tractor of simple and inexpensive construction, capable of utilization as a power plant without substantial alteration or adjustment of parts.

Furthermore, it is to be understood that while I have disclosed an agricultural instrument mounted on the tractor, it is equally adapted for pulling implements or vehicles in the usual manner, and may readily be constructed so that it may be operated at a relatively rapid rate of speed when desired for hauling wagons or similar uses.

Besides its adaptation for these various requirements, I have produced a tractor that is extremely simple, has a relatively small number of parts, and is sufficiently strong to withstand the heaviest usage.

Further objects and advantages of my construction will be apparent from the following description taken in connection with the accompanying drawings, in which Fig. 1 is a side view showing the excavating implement in contact with the surface of the ground.

Fig. 2 is a top plan view,

Fig. 3 is a vertical transverse sectional view through the axle of the drive wheel, the guide wheel being shown in end view, and Fig. 4 is a longitudinal sectional view through the mounting for the excavating implement, said implement being shown in side plan view.

The tractor includes a frame 10 which is preferably as light as is consistent with the required strength and rigidity. Mounted upon the frame is a motor 11, preferably a heavy duty engine of any desired type, an ordinary four cylinder gasoline engine being shown in the drawings, having a radiator 12 at one end; but it is apparent that the construction and type of engine is immaterial, the construction of my tractor being such that any engine may be mounted upon frame 10. I preferably provide a seat 13 for the operator, which may be located adjacent one end of frame 10; and means for controlling the engine 11 are mounted on the frame in proper position convenient to seat 13, such control means being of any type and preferably including a pedal 14 or other element for operating a clutch 15, and a lever 16 or other means for operating a gear shift 7. If desired, it is apparent that a standard form of brake may also be used.

I provide means for supporting the end of the tractor adjacent to seat 13, said means preferably consisting of a wheel or wheels 18 which may be adapted to be rotated about a vertical axis for steering the tractor; and while I have disclosed a single wheel and a specific method for steering that wheel, it is apparent that two wheels may be used, and that many other standard methods of turning said wheels for steering purposes may be employed. In the preferred form shown, wheel 18 is carried by a fork 19, the upper end of which is rotatably mounted in frame 10, and carries means for rotating it to steer the tractor. Such means may consist of a pinion 20 carried by the upper end of fork 19, meshing with pinion 21 mounted on vertical shaft 22 carrying the usual steering wheel 23. By properly proportioning pinions 20 and 21, the tractor may be steered readily over rough ground without putting too much strain on the arms of the operator. It is apparent that two wheels may be carried by fork 19 or its equivalent and steered in the same way.

It is highly advantageous to provide a construction by which the tractor may be driven in either direction with equal facility. Various arrangements for this purpose are possible, preferably consisting of dual controls for the motor 11 and either two separate seats or a single seat, which may be shifted when the direction of drive is reversed. Numerous arrangements of controls and seats are obviously possible; and while I have shown a preferred form, I do not consider my invention to be limited thereto, either as to specific relation of the seat and controls, or as to the exact location thereof relative to the motor. I prefer to use a single seat 13 rotatably mounted on frame 10 so that it may be shifted by the operator at will, the steering means preferably being located adjacent to the axis of rotation of the seat, and dual controls for the motor being provided so that the same can be controlled from either position of the seat.

Mounted adjacent to one end of frame 10 is the tractor driving mechanism, which preferably consists of a transverse shaft 24 rotated by the motor and carrying one or more drive wheels 25. Any preferred form of rotating shaft 24 by means of motor 11 may be provided. I have shown a worm gear 26 mounted on shaft 24 and meshing with a worm 27, preferably connected to the drive shaft of motor 11 through gear shift mechanism 17.

This gear shift may be of any desired type, many of which are well-known in the art in connection with automobile construction, and preferably includes means for driving worm 27 in either direction, a neutral position in which the motor may be left running without operating the worm; and if desired, two or more rates of speed to accommodate the tractor both to heavy duty and to lighter requirements, such as hauling, where speed is desirable.

I have disclosed a drive wheel 25 mounted on shaft 24 adjacent frame 10 at one side, and a wheel 28 on said shaft at the opposite side of frame 10. Wheel 28 may be similar to wheel 25, and may operate as a drive wheel or, if desired, it may be rotatably mounted on the shaft and act merely as a support.

I provide means for varying the distance between wheels 25 and 28 to permit the use of the tractor in cultivating between rows varying in width. For this purpose, I preferably have one or both wheels slidably mounted and adapted to be positioned at varying distances from frame 10. In the preferred form, I have shown wheel 28 as being slidably mounted on shaft 24, wheel 25 being in fixed position. For this purpose, shaft 24 preferably consists of an outer tubular shaft 29 upon which worm gear 26 is mounted, and which extends from the side of the frame adjacent wheel 28 through bearings in the frame, and which carries wheel 25. Rotatably mounted within the outer shaft 29 is inner shaft 30, having a keyway or slot 31 engaged by keys or lugs mounted on outer shaft 29, so that inner shaft 30 is positively rotated thereby.

Wheel 28 is mounted on said shaft between collars 32, and may be keyed to said shaft 30 if desired. Collars 33 are also mounted on shaft 30 adjacent the ends of outer shaft 29. By properly adjusting collars 32 and 33 on the shaft 30, and by sliding said shaft endwise, the distance of wheel 28 from wheel 25 may be varied within wide limits, the particular advantage of this construction being that the parts may be arranged as shown in Fig. 3 with a relatively short portion of shaft 30 projecting from each side of the machine.

This avoids a long, projecting shaft, which would be liable to suffer and inflict damage; and the tractor is ordinarily used in this position. When desired, however, the inner shaft may be arranged to project a substantial distance to one side of the tractor, permitting the construction of a relatively narrow machine capable of a very wide spread between wheels.

It will be apparent from the description and drawing, that the transverse drive shaft comprises concentric inner and outer members, which are constrained to rotate together, but are adjustable longitudinally with respect to each other. The drive wheel is carried by the outer member and the supporting wheel by the inner member.

While the tractor as so far described may be used for traction purposes, and agricultural implements of the usual kinds may be attached thereto and operated in the ordinary manner, I prefer to mount certain kinds of agricultural implements directly upon the tractor, and preferably beyond the drive wheel, though if found desirable such implements may be mounted between the drive wheel and guide wheel 18. For this purpose, I utilize an arm connected at one end to the frame of the tractor and carrying at its outer end the agricultural implement, which is preferably positively rotated by the tractor mechanism.

One form of my invention is disclosed, in which I provide an arm or frame 34 pivoted at one end to shaft 24, and carrying an agricultural implement 35 at its outer end.

I provide means for raising and lowering arm 34 to control the operation of the implement 35. Various means may be used for this purpose, the preferred method consisting of providing an extension 36 of arm 34, means carried by frame 10 being adapted to shift the extension 36 and rock arm 34 about its pivot. Extension 36 is disclosed in Fig. 1 as extending upwardly; but it is understood that this is merely illustrative, as this extension may extend directly forward to a position adjacent the operator's seat, and control means may be provided at that point.

For the purpose of controlling arm 34, I have disclosed a rod 37 passing through a standard 38 mounted on frame 10, and provided with a hand wheel 39 threaded on said rod. A link 40 connects adjustable rod 37 with the extension 36, preferably passing through a vertically elongated aperture in said extension and through a similar aperture in an up-turned end 41 of rod 37, said link being preferably held in position by nuts threaded on the ends thereof.

Means is provided for permitting arm 34 to yield slightly when implement 35 meets with an unusual obstruction. Various constructions may be employed for this purpose, preferably including a spring element in the mechanism for elevating and lowering arm 34. In the mechanism disclosed, I preferably provide a helical spring 42 coiled about link 40 bearing at one end against the flange 41 of rod 37, and at the other end against a collar 43 adjustably mounted on link 40. A collar, nut or similar element is provided on link 40 adjacent the side of extension 36 closest to spring 42, so that the normal action of the spring is to force arm 34 downward until the end nut on the link contacts with flange 41 of adjusting rod 37; but an obstruction in the path of implement 35 will raise it against the pressure of spring 42, link 40 sliding through flange 41.

It will be evident that various forms of agricultural implements may be mounted on the outer end of arm 34, and my invention comprehends the use of the usual implements mounted thereon and preferably detachable therefrom. In the preferred form of my invention, however, I have provided means for carrying a rotatable implement, and means for rotating said implement.

The carrying means includes a bearing 44 at the outer end of arm 34, in which is mounted a hollow shaft 45 adapted to carry an implement 35.

I have disclosed a hanger 46 pivoted on the outer shaft 29 at the opposite side of drive wheel 25 from arm 34, the lower end of hanger 46 carrying a bearing 47 in which shaft 45 rotates; but it is apparent that this is not an essential part of my invention, as the outer end of arm 34 may be provided with a plurality of bearings and may have sufficient width to provide proper support for shaft 45 when subjected to transverse stresses through the implement 35. The bearings for shaft 45 are preferably of the ball bearing type. The bearings and shaft 45 are preferably arranged and constructed so that the implement 35 may be mounted either at the outer side of drive wheel 25 or at the inner side, as indicated in dotted lines in Fig. 2. In the form of construction disclosed, I have accomplished this object by having shaft 45 of hollow construction, the inner shaft 48 being splined or keyed thereto and adapted to carry implement 35 on one end, which is preferably tapered and may be slotted, rectangular, or otherwise constructed so as to afford positive engagement with implement 35. It will be apparent that by removing the implement and reversing the position of inner shaft 48, the implement may be mounted adjacent the center line of the tractor.

Any desired means of rotating implement 35 may be utilized, the preferred form disclosing sprockets 49 mounted on shafts 29 and 45 and connected by a chain 50, the sprockets being so proportioned that the peripheral speed of implement 35 is slightly greater than the peripheral speed of drive wheel 25.

A great variety of implements may be mounted on shaft 45, the form disclosed having a cylindrical or preferably a slightly frustoconical hub or body having a plurality of spirally arranged outstanding flanges 52 mounted thereon, the effect of this type of excavator being to dig into the soil and throw it to one side, the ejecting operation being similar to that of an auger.

The operation of the machine will be apparent from the foregoing description, but a short summary will be given.

When driving to and from work and when using the tractor for any purpose besides cultivation, shaft 30 is normally in the position shown in Fig. 3, extending equally on both sides of the machine, and arm 34 is elevated with implement 35 clear of the ground. For hauling purposes, the load is connected to suitable links at either end of the frame 10, and the tractor is driven in the usual manner, either end foremost, the gear shift permitting travel in either direction with equal facility and, if desired, a change of speed.

For use in plowing or cultivating, the distance between wheels 25 and 28 is adjusted if necessary by properly locating collars 32 and 33. Hand wheel 39 is manipulated to bring implement 35 into contact with the soil, any desired degree of pressure upon the implement being available by proper adjustment of rod 37 up to the limit provided by the weight of the machine. The tractor then moves ahead, and the peripheral speed of implement 35, which is slightly greater than that of wheel 25, causes it to dig in and perform its excavating function, at the same time assisting in the progress of the machine and concentrating the power of the motor on the excavator in the presence of obstacles.

If a stone or similar obstruction is encountered, the tendency of the cultivator will be to ride over the stone, its rotation aiding in this effect, the spring connection 42 permitting arm 34 to rise slightly without raising the wheels of the tractor off of the ground. This operation occurs, regardless of the direction in which the tractor is traveling. When the work is completed, arm 34 is raised and the tractor is ready to return without further adjustment.

In view of the desirability of providing positive traction by the rotating implement, I have particularly described a type of implement constructed so that it has a tendency to dig into the soil, a tendency increasing proportionately to the increase of power, insuring the maximum both of excavating effect and of tractive effort.

Furthermore, the tapered base and auger-like construction tend to throw the dirt to one side of the furrow in a highly desirable way. The advantage of the particular type of excavating implement disclosed is that it is equally effective regardless of the direction in which the tractor is operated, both as to excavating and tractive effects. Such a construction avoids any change of implement when the direction of operation of the tractor is reversed, and permits the implement to be operated up to within a few inches of a fence, and then operated in the reverse direction, merely by reversing the direction of drive of the tractor, permitting the utilization of practically every inch of ground. This effect is also due in part to the arrangement of the excavating implement projecting clearly beyond both the frame of the tractor and the support for the excavator itself.

While the above advantages adapt the specific excavating implement described particularly to use with this type of machine, it is apparent that many other implements, both rotating and non-rotating, may be mounted on the end of supporting frame 34 without departing from my invention in its broad aspect.

It is also apparent that the specific arrangement of rotating excavator and drive shaft may be utilized in connection with a machine not carrying its own motive power, the drive shaft being rotated by the rotation of the wheel or wheels as the machine is hauled over the ground.

While I have described a preferred form of my invention and a number of variations thereof, it will be apparent that many other changes in and modifications of the preferred form as disclosed are readily possible; and I do not consider my invention to be limited to the form disclosed with the variations indicated, as its scope is commensurate with the broad inventive ideas contained in this specification and covered by the following claim.

I claim:

In a tractor including a wheel supported frame, a tool support carried thereby, a hollow shaft on the support, a driving connection between the shaft and the wheels of the tractor, and a tool carrying shaft fitting within the hollow shaft from either end thereof and having a driving connection with said shaft.

Signed at Durham, in the county of Durham, and State of North Carolina, this 21st day of July A. D. 1921.

BRITTON E. BYRD.